(12) United States Patent
Chang (10) Patent No.: US 11,189,893 B2
(45) Date of Patent: Nov. 30, 2021

(54) BATTERY MODULE

(71) Applicant: STL Technology Co., Ltd., Kaohsiung (TW)

(72) Inventor: Cooper Chang, Kaohsiung (TW)

(73) Assignee: STL TECHNOLOGY CO., LTD., Kaohsiung (TW)

( * ) Notice: Subject to any disclaimer, the term of this patent is extended or adjusted under 35 U.S.C. 154(b) by 118 days.

(21) Appl. No.: 16/817,592

(22) Filed: Mar. 12, 2020

(65) Prior Publication Data

US 2021/0143388 A1    May 13, 2021

(30) Foreign Application Priority Data

Nov. 13, 2019    (CN) .......................... 201911105462.9

(51) Int. Cl.
*H01M 50/581*    (2021.01)

(52) U.S. Cl.
CPC .... *H01M 50/581* (2021.01); *H01M 2200/103* (2013.01)

(58) Field of Classification Search
None
See application file for complete search history.

(56) References Cited

U.S. PATENT DOCUMENTS

| | | | |
|---|---|---|---|
| 2011/0008655 A1* | 1/2011 | White | H01M 50/213 429/62 |
| 2011/0223776 A1* | 9/2011 | Ferber, Jr. | H01R 11/30 439/39 |
| 2011/0287287 A1* | 11/2011 | Kang | H01M 10/613 429/82 |
| 2015/0280204 A1* | 10/2015 | Byun | H01M 10/654 429/61 |
| 2016/0322623 A1* | 11/2016 | Kim | H01M 10/425 |
| 2018/0130990 A1* | 5/2018 | Liu | H01M 50/20 |
| 2019/0020001 A1* | 1/2019 | Nakano | H01M 10/6553 |
| 2021/0074988 A1* | 3/2021 | Hou | H01M 50/581 |
| 2021/0135318 A1* | 5/2021 | Wen | H01M 50/50 |

* cited by examiner

*Primary Examiner* — Alix E Eggerding
(74) *Attorney, Agent, or Firm* — Chun-Ming Shih; HDLS IPR Services (57) ABSTRACT

The present invention provides a battery module, including a plurality of battery cells, a plurality of conductive sheets, and at least one plastic protective layer, wherein each conductive sheet is connected in series or in parallel with a plurality of battery cells. The plastic protective layer is formed on the partial surface of the conductive sheet by injection molding to prevent the electrolyte leaked from the defective battery cell from contacting the conductive sheet, causing rise in temperature of the battery cell and causes melt or explosion of the battery cell, which is helpful to improve the safety of the battery module.

11 Claims, 6 Drawing Sheets

BATTERY MODULE

This non-provisional application claims priority claim under 35 U.S.C. § 119(a) on China Patent Application No. 201911105462.9 filed Nov. 13, 2019, the entire contents of which are incorporated herein by reference.

FIELD OF THE INVENTION

The present invention provides a battery module, which can prevent the electrolyte leaked from the defective battery cell from contacting the conductive sheet and the protection unit, causing rise in temperature of the defective battery cell to improve the safety of the battery module.

BACKGROUND

A rechargeable battery, storage battery, or secondary cell is a type of electrical battery, and includes lead-acid, nickel-cadmium (NiCd), nickel-metal hydride (NiMH), lithium-ion (Li-ion), and lithium-ion polymer (Li-ion polymer). The lithium-ion batteries have a high energy density, no memory effect and low self-discharge, and have been widely used in mobile phone, laptop computer, digital camera and electric vehicles. In general, multiple battery cells are connected in serial and/or in parallel to be a battery module.

The battery cell mainly comprises a positive electrode, an electrolytic, a negative electrode, a porous separator, and a case. The porous separator separates the positive electrode from the negative electrode. The case is used to cover the above-mentioned positive electrode, porous separator, electrolyte and negative electrode, and the case is usually made of a metal material.

When one battery cell of a battery module is defect, the electrolyte may be leaked from the defective battery cell and transferred to other battery cells or conductive sheets in gas or liquid state. Further, the conductive sheet receives heat from the electrolyte by thermal conduction, which may cause rias in the temperature of the conductive sheet and the connected battery cells, and may cause damage to other normal battery cells.

SUMMARY

An objective of the present invention is to provide a battery module, which comprises a plurality of conductive sheet and/or at least one protection unit. A plastic protective layer is provided on the outer surface of the conductive sheet and/or the protection unit by injection molding, thereby providing additional protection of the conductive sheet and/or the protection unit.

An objective of the present invention is to provide a battery module, which includes a plurality of battery cells, a plurality of conductive sheets, a plurality of protection units, and at least one plastic protective layer, wherein the conductive sheet is connected with the battery cells in series, and the protection unit is connected with the battery cells in parallel. The plastic protective layer is provided on the outer surface of the conductive sheet and the protection unit by injection molding. The plastic protective layer completely covers the protection unit and partial surface of the conductive sheet to prevent the electrolyte leaked from the defective battery cell from contacting large area of the conductive sheet and/or the protection unit, causing rise in temperature of other normal battery cells.

An objective of the present invention is to provide a battery module, which includes a plurality of battery cells, at least one conductive sheet, and at least one plastic protective layer, wherein the conductive sheet is connected with battery cells in series and/or in parallel. The plastic protective layer is provided by injection molding on partial surface of the conductive sheet to avoid contact between the high temperature electrolyte and the conductive sheet, thereby causing rise in temperature of the conductive sheet and other normal battery cells.

To achieve the objectives mentioned above, the present invention provides a battery module which includes a plurality of battery cells; a plurality of conductive sheets being respectively connected with the battery cells in series; at least one protection unit being connected to two the conductive sheets, and thus the battery cells connected in parallel via the protection unit, wherein when temperature of the protection unit is greater than a preset temperature, or current of the protection unit is greater than a preset current, the protection unit will be disconnected; and at least one plastic protective layer disposed on the protection unit and partial surface of the conductive sheet by injection molding.

The present invention further provides a battery module which includes plurality of battery cells; at least one conductive sheet being connected with the battery cells in parallel; and at least one plastic protective layer disposed on partial surface of the conductive sheet by injection molding.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
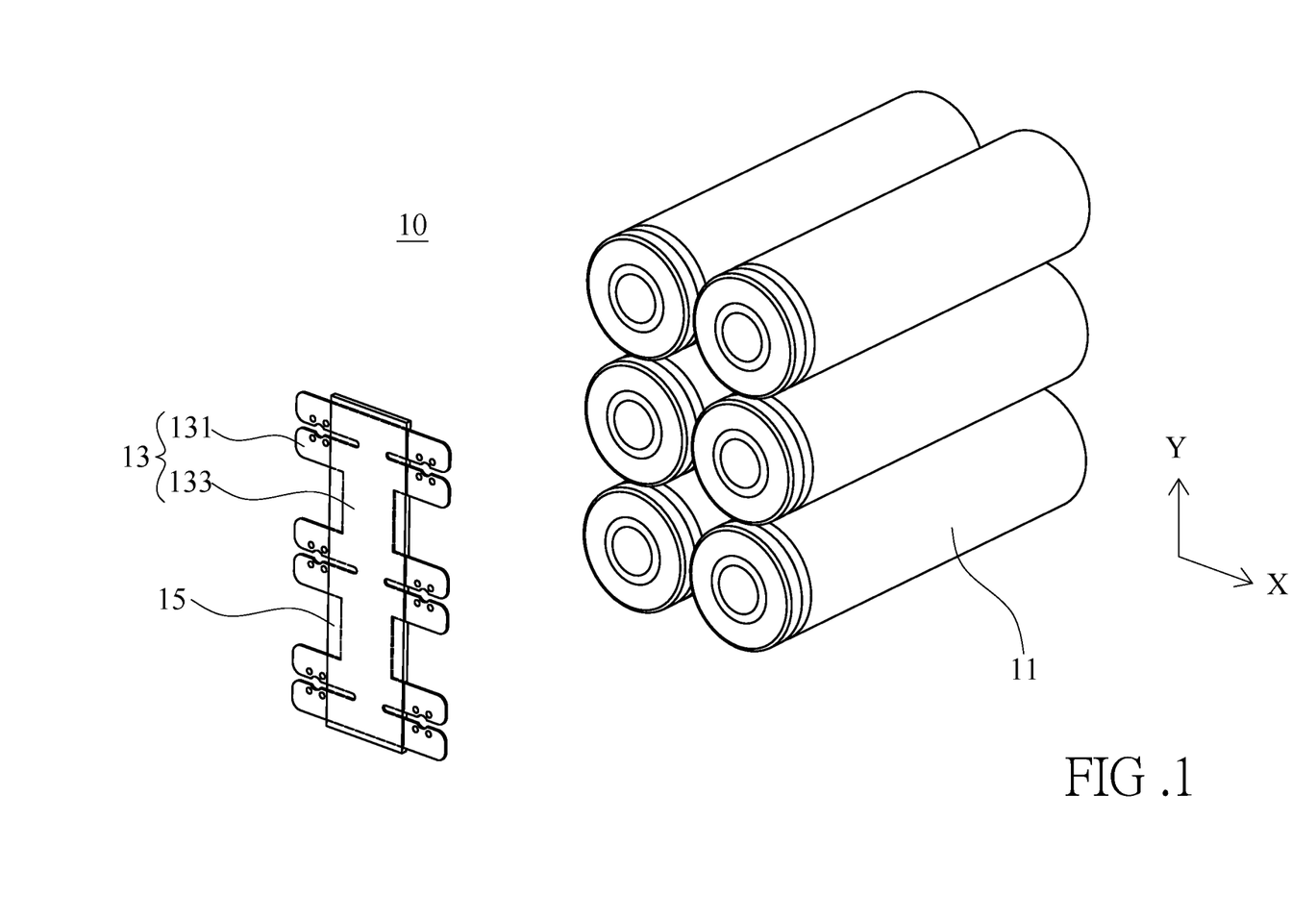
FIG. 1 is an exploded perspective view of a battery module according to an embodiment of the invention.

Please refer to FIG. 1, which is an exploded perspective view of a battery module according to an embodiment of the invention. The battery module 10 mainly includes a plurality of battery cells 11, at least one conductive sheet 13 and at least one plastic protective layer 15, wherein the conductive sheet 13 is connected with a plurality of battery cells in series and/or in parallel, and the plastic protective layer 15 is disposed on partial surface of the conductive sheet 13 by injection molding.

In one embodiment of the invention, a plurality of battery cells 11 may be arranged as a matrix, wherein the battery cells 11 are arranged along a first direction X and a second direction Y, and the first direction X is approximately perpendicular to the second direction Y. The adjacent battery cells 11 along the first direction X are arranged in opposite directions, and the positive and negative electrodes of the adjacent battery cells 11 are in opposite directions. For example, the battery cells 11 along the first direction X are staggered arrangement, and the arrangement direction of the battery cells 11 along the second direction Y is the same. Of course, the arrangement of the above mentioned battery cells 11 is only an embodiment of the invention. In practical applications, the battery cells 11 may not be arranged as a matrix.

The conductive sheet 13 is connected with a plurality of battery cells 11 in series and/or in parallel. For example, the conductive sheet 13 may be connected to the positive electrode and the negative electrode of adjacent battery cells 11 by spot welding or laser welding. When the battery cell 11 is arranged in a matrix, the conductive sheet 13 is connected to the two adjacent battery cells 11 along the first direction X in series, and is also connected to the two or more battery cells 11 along the second direction Y in parallel. The conductive sheet 13 may be made of a metal material, such as a nickel sheet and a copper sheet that are low-resistance material.

In one embodiment of the invention, the conductive sheet 13 may include a plurality of first conductive parts 131 and at least one second conductive part 133, wherein the second conductive part 133 is connected to the two adjacent first conductive parts 131. For example, the conductive sheet 13 is approximately fish-bone. Specifically, each first conductive part 131 is connected to two adjacent battery cells 11 along the first direction X in series, the second conductive part 133 is connected to two adjacent first conductive parts 131, and thus two or more battery cells 11 arranged along the second direction Y are connected in parallel.

As shown in FIG. 1, the three battery cells 11 on the left side are connected in parallel through the conductive sheet 13, and the three battery cells 11 on the right side are also connected in parallel through the conductive sheet 13. Further, the three battery cells 11 on the left side and the three battery cells on the right side are connected in series through the conductive sheet 13. Of course, the series and parallel connection of the six battery cells 11 is only an embodiment of the invention, and is not limitation of the invention.

Specifically, when two battery cells 11 are connected in series, only one conductive sheet 13 may be provided to connect battery cells 11, as shown in FIG. 1. For example, only two battery cells 11 are arranged in the first direction X, and two or more battery cells 11 are arranged in the second direction Y. When three battery cells 11 are connected in series, two or more conductive sheets 13 may be provided to connect battery cells 11, as show in FIG. 2. For example, three battery cells 11 are arranged in the first direction X, and two or more battery cells 11 are arranged in the second direction Y. The front end and the rear end of each battery cell 11 are respectively connected to a conductive sheet 13. The conductive sheet 13 at the front end is connected to the six battery cells 11 on the left side, and the conductive sheet 13 at the rear end is connected to the six battery cells 11 on the right side.

Figure 3:
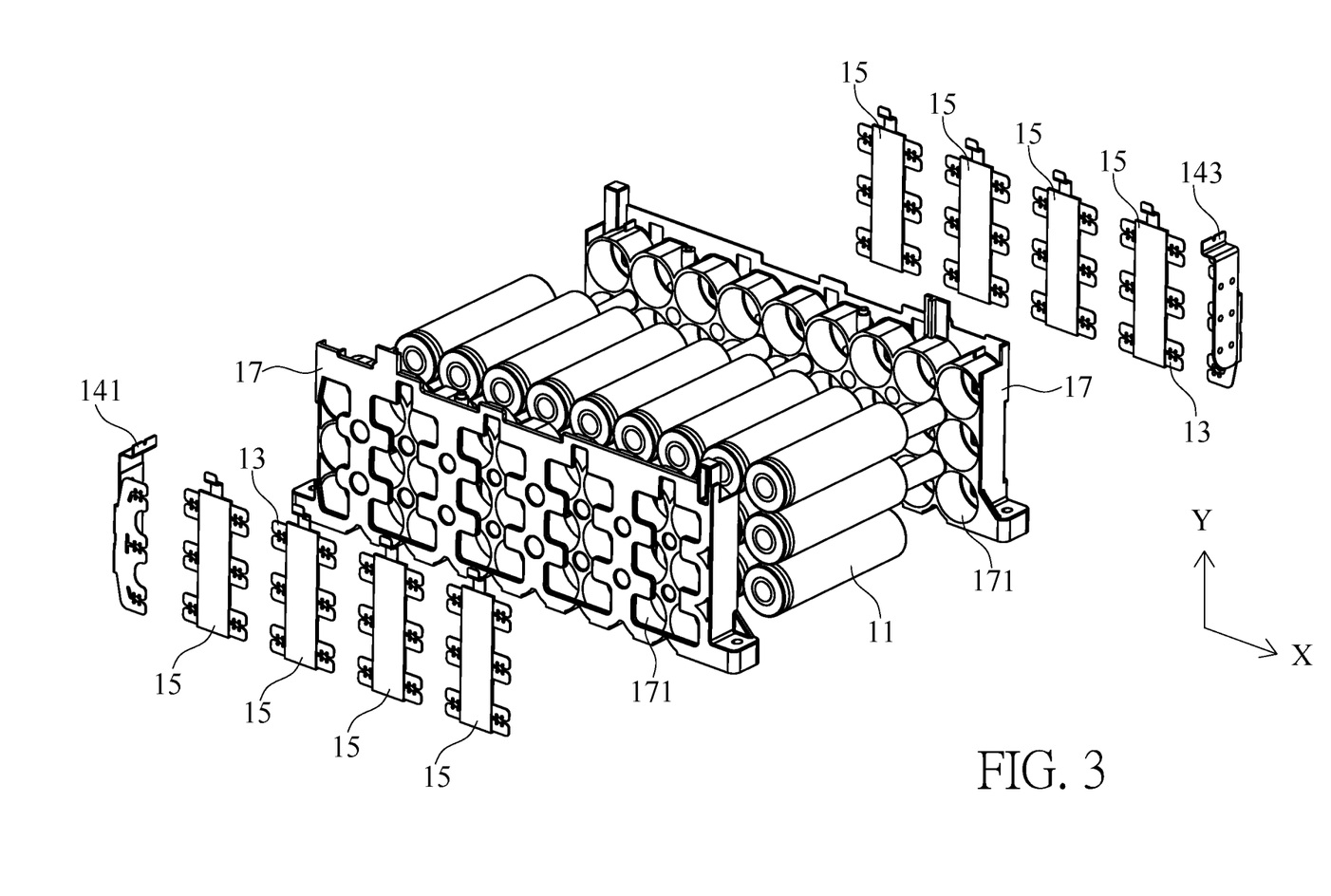
FIG. 3 is an exploded perspective view of a battery module according to another embodiment of the invention.

In other embodiment of the invention, the number of battery cells 11 connected in series may be more than three, and the number of conductive sheets 13 is also more than three, as shown in FIG. 3. Further, the battery module 10 may include at least one first conductive sheet 141 and at least one second conductive sheet 143, wherein the first conductive sheet 141 and the second conductive sheet 143 are connected to part of the battery cells 11 in parallel to be an output terminal and/or an input terminal of the battery module 10. In general, the first conductive sheet 141 and the second conductive sheet 143 are usually connected to one or more battery cells 11 on the side of the battery module. For example, the first conductive sheet 141 and the second conductive sheet 143 are connected to the battery cells 11 on the side along the second direction Y.

In one embodiment of the invention, the battery module 10 further includes at least one fixed frame 17 to fix battery cells 11. For example, the number of fixed frames 17 may be two, and a plurality of fixed holes 171 are provided on the fixed frames 17. The two ends of the battery cells 11 are disposed in the fixed holes 171 of the two fixed frames 17 respectively.

The plastic protective layer 15 is provided on partial surface of the conductive sheet 13. The plastic protective layer 15 may be provided by injection molding to improve the protection and covering properties for the conductive sheet 13, and is more suitable for providing on the conductive sheet 13 of an irregular shape.

As described in conventional technology, the high-temperature electrolyte may leak from the defective battery cell 11 in a liquid or gaseous state. The leaked electrolyte may diffuse around and directly contact with other battery cells 11 and conductive sheet 13, causing rise in temperature of other battery cells 11 and conductive sheet 13. In general, the conductive sheet 13 has a larger contact area, and thus the leaked electrolyte is easier to contact with the conductive sheet 13 to transfer larger amount of heat to the conductive sheet 13, thereby causing rise in temperature of the conductive sheet 13. Thereafter, the high-temperature conductive sheet 13 will transfer heat to the battery cells 11 through thermal conduction, causing rise in temperature of the battery cell 11 and increasing the probability of damage to the battery cell 11.

The present invention further provides a plastic protective layer 15 on partial surface of the conductive sheet 13 to greatly reduce the contact area between the conductive sheet 13 and the leaked electrolyte and the heat transferred to the conductive sheet 13 from the leaked electrolyte. In addition, the plastic protective layer 15 may contact and absorb heat from the leaked electrolyte and melt to lower the temperature in battery module 10 and improve protection of other normal battery cells 11.

In actual application, the plastic protective layer 15 may cover partial surface of the first conductive part 131 of the conductive sheet 13 and completely cover the second conductive part 133 of the conductive sheet 13. The first conductive part 131 which is not covered by the plastic protective layer 15 may be connected to the battery cell 11. The plastic protective layer 15 may be provided on partial surface of the first conductive sheet 141 and the second conductive sheet 143 by injection molding.

In one embodiment of the invention, the surface of the conductive sheet 13 connected to the battery cell 11 may be defined as an inner surface, the other surface of the conductive sheet 13 is defined as an outer surface, and the surface between the inner surface and outer surface is defined as a side surface. The plastic protective layer 15 may be disposed on the outer surface, the inner surface, and the side surface of the conductive sheet 13 to provide complete protection to the conductive sheet 13. In other embodiment of the invention, the plastic protective layer 15 may be provided only on the outer surface and the side surface of the conductive sheet 13, and the inner surface of the conductive sheet 13 is not provided with the plastic protective layer 15. Because the leaked electrolyte is more likely to contact the outer and side surfaces of the conductive sheet 13 and less to the inner surface of the conductive sheet 13. Therefore, the plastic protective layer 15 may be only disposed on the outer surface and the side surface of the conductive sheet 13 to provide sufficient protection to the conductive sheet 13.

Figure 2:
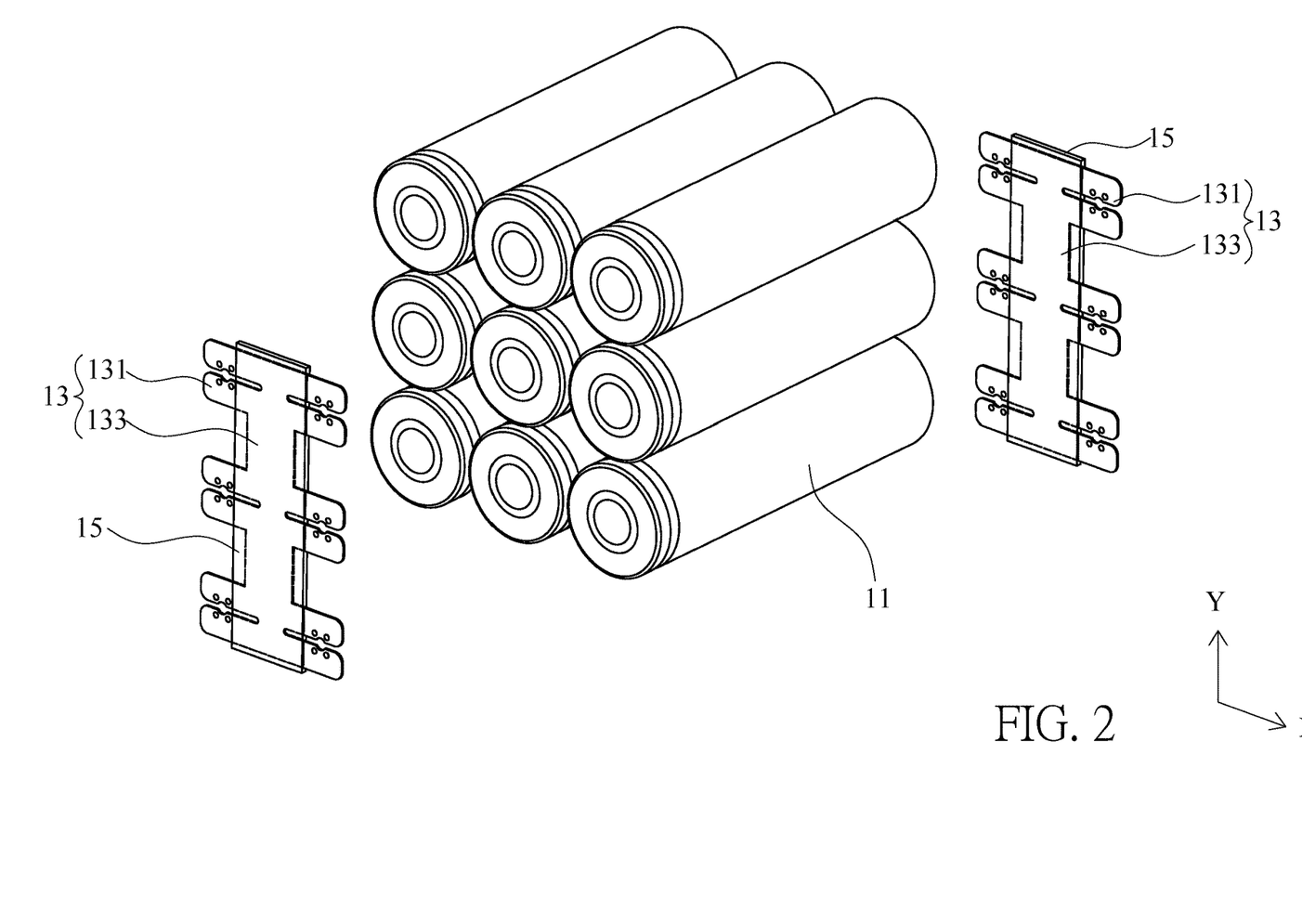
FIG. 2 is an exploded perspective view of a battery module according to another embodiment of the invention.

In above embodiments of the invention, six, nine and twenty-seven battery cells are described, as shown in FIG. 1, FIG. 2 and FIG. 3. However, in practical applications, the number of the battery cell 11 may be at least two, the conductive sheet 13 is connected two battery cells 11 in parallel or series, and the plastic protective layer 15 is disposed on partial surface of the conductive sheet 13 to reduce contact area between the leaked electrolyte and the conductive sheet 13. The number of battery cells 11 is not limitation of the scope of the invention.

Figure 4:
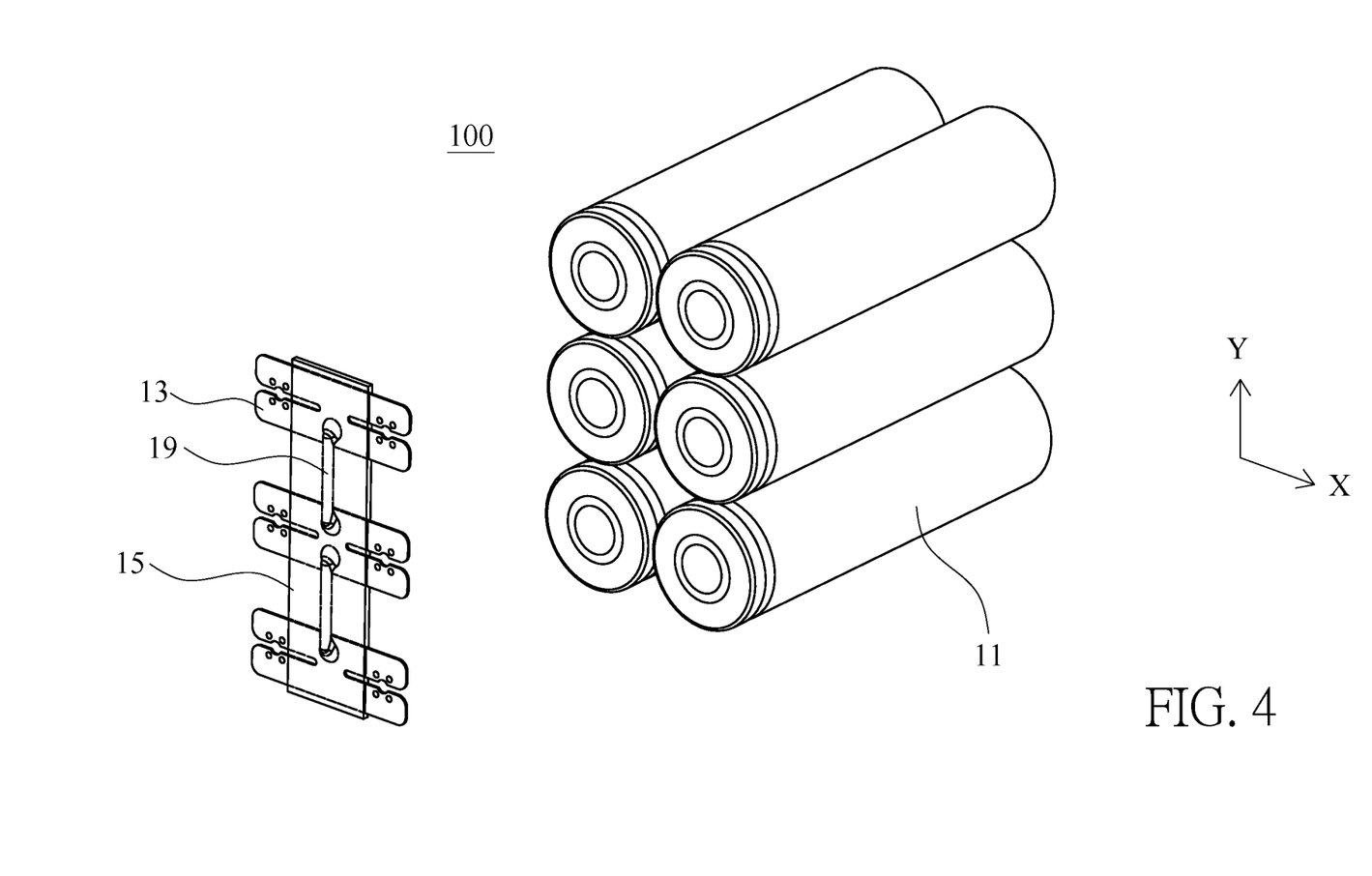
FIG. 4 is an exploded perspective view of a battery module according to another embodiment of the invention.

Please refer to FIG. 4, which is an exploded perspective view of a battery module according to another embodiment of the invention. The battery module 100 includes a plurality of battery cells 11, a plurality of conductive sheets 13, at least one protection unit 19, and at least one plastic protective layer 15, wherein the conductive sheet 13 is connected to battery cells 11 in series, the protection unit 19 is connected to two conductive sheets 13, and the plastic protective layer 15 is formed by injection molding on the protection unit 19 and partial surface of the conductive sheet 13.

The protection unit 19 is connected two conductive sheets 13 in parallel, and thus the battery cells 11 connected to the conductive sheet 13 are connected in parallel via the protection unit 19. When the temperature of the protection unit 19 is greater than a preset temperature, or the current through the protection unit 19 is greater than a preset current, the protection unit 19 will be disconnected, turned off or blown.

When one of the battery cells 11 of the battery module 100 is defect and shorts, other normal battery cells 11 may charge the defective battery cell 11 via the protection unit 19, so that the current flows through the protection unit 19 will be increased, causing rise in temperature of protection unit 19. When the current of the protection unit 19 is greater than the preset current and/or the temperature of the protection unit 19 is greater than the preset temperature, the protection unit 19 will be blown out to form an open circuit between the normal battery cells 11 and the defective battery 11 in parallel so that the normal battery cell 11 will not charge the shorting battery cell 11 in parallel.

The battery module 100 of the invention is able to prevent the normal battery cells 11 from continuously charging the defective battery cell 11 with a large current and rise in temperature of the defective battery cell 11. Thus, the occurrence of melting or explosion of the defective battery cell 11 can be effectively reduced, so as to improve the use safety of the battery module 100.

Specifically, the protection unit 19 described in the invention may include, but is not limited to, a thermal fuse, a current fuse, a solder wire, a single-core copper wire, a resettable fuse (PTC), a resistor, etc. For example, the melting point of the solder wire is relatively low, so when the temperature of the solder wire rises, the solder wire will blow to disconnect the defective battery cell and the normal battery cells in parallel. The installation cost of the solder wire is low, and can be connected to two conductive sheets 13 by an electric soldering iron or a welding gun. In addition, the characteristics of single-core copper wires and resistors are similar to solder wires and can be set in a similar manner, which also has the advantages of low installation cost and easy installation.

In actual application, the preset temperature and/or the preset current can be changed through the material, length, width, and/or cross-sectional area of the protection unit 19.

Taking the preset temperature as an example, a tin wire containing lead will fuse at about 190° C., and a lead-free tin wire will fuse at about 220° C. If the temperature generated by the defective battery cell 11 is larger than 600° C., the tin wire (protection unit 19) will be blown to form open circuit between the defective battery cell 11 and the normal battery cells 11 in parallel before the defective battery cell 11 overheats, melts or explodes. Taking the preset current as an example, when the current of 40-50 A is passed, the tin wire will fuse due to high temperature. Further, the current flowing the defective battery cell 11 is about 100-200 Å, thus the tin wire (protection unit 19) will be blown before the current larger then 40-50 Å, and the connection between the defective battery cell 11 and normal battery cells 11 in parallel will be disconnected. Moreover, the current flowing the defective battery cell 11 is related to the characteristics of battery cell 11 and the number of battery cells 11 connected in parallel.

In addition, if a 1 ohm 0603 resistor is selected as the protection unit 19, it can withstand about $\frac{1}{10}$W. When the instantaneous current is 100 Å, the resistor will be fused, which can disconnect the connection between the defective battery cell 11 and the normal battery cell 11 in parallel.

Figure 5:
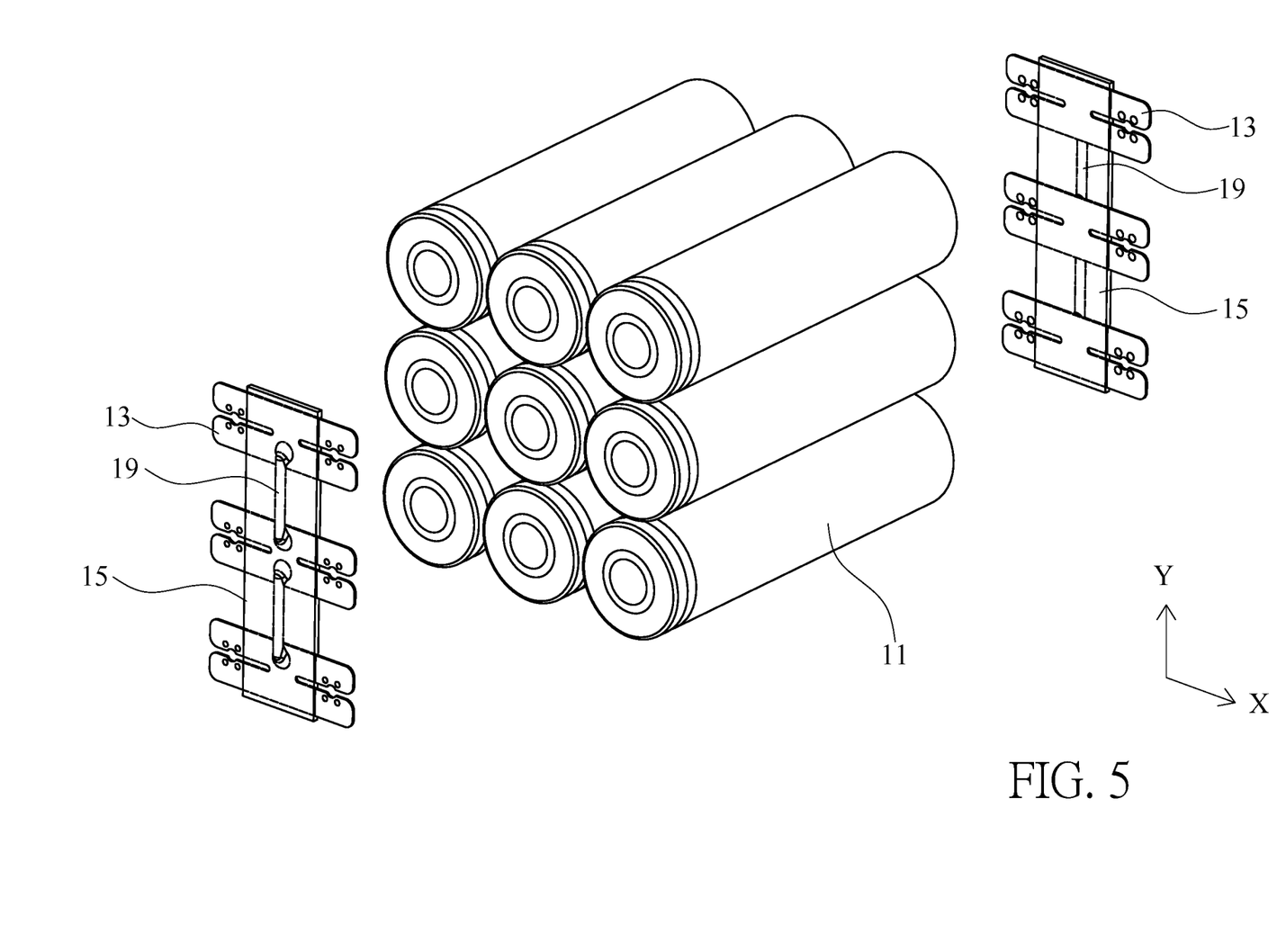
FIG. 5 is an exploded perspective view of a battery module according to another embodiment of the invention.

Specifically, when two battery cells 11 are connected in series, only one conductive sheet 13 is provided, as shown in FIG. 4. For example, only two battery cells 11 are arranged in the first direction X, and two or more battery cells 11 are arranged in the second direction Y. When three battery cells 11 are connected in series, two conductive sheets 13 may be provided. For example, three battery cells 11 are arranged in the first direction X, and two or more battery cells 11 are arranged in the second direction Y, as shown in FIG. 5. The front end and the rear end of the battery cells 11 are respectively connected to a conductive sheet 13. Specifically, the conductive sheet 13 at the front end is connected to the six battery cells 11 on the left side, and the conductive sheet 13 at the rear end is connected to the six battery cells 11 on the right side.

Figure 6:
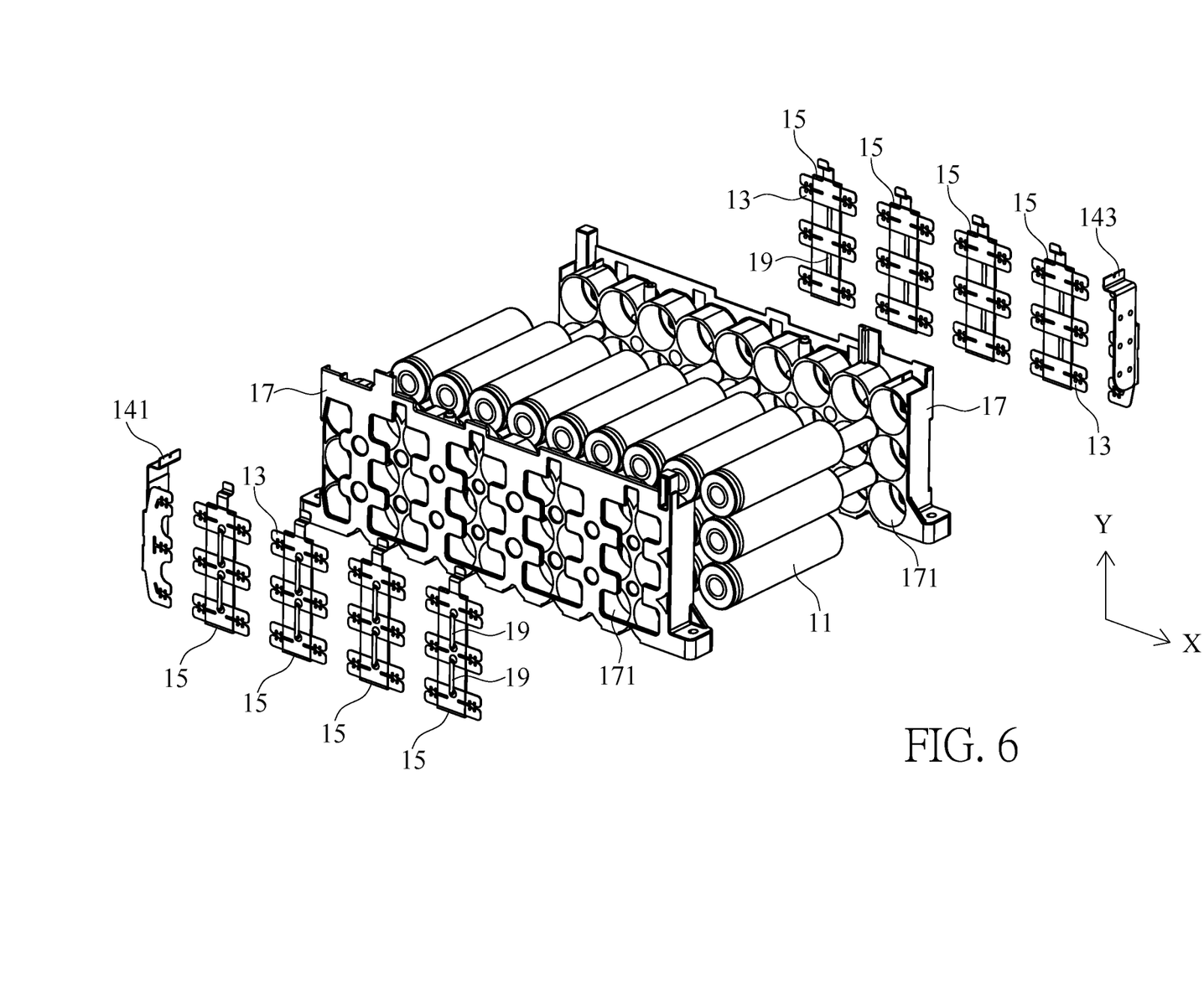
FIG. 6 is an exploded perspective view of a battery module according to another embodiment of the invention.

In other embodiment of the invention, the number of battery cells 11 connected in series may be three or more, and the number of conductive sheets 13 is also three or more, as shown in FIG. 6. In addition, the battery module 10 further includes at least one first conductive sheet 141 and at least one second conductive sheet 143 that are connected to part of the battery cells 11 in parallel to be as an output terminal and/or an input terminal of the battery module 10.

In one embodiment of the invention, the battery module 10 further includes at least one fixed frame 17 to fix each battery cell 11. For example, the number of fixed frames 17 may be two, and the fixed frame 17 comprises a plurality of fixed holes 171. The fixed holes 171 of the two fixed frames 17 respectively contain the two ends of the battery cells 11 for fixing battery cells 11 thereon.

The plastic protective layer 15 is disposed on the protection unit 19 and partial surface of the conductive sheet 13, wherein the plastic protective layer 15 may be provided by injection molding to improve protection of the protective unit 19 and the conductive sheet 13. In addition, the protective layer 15 is more suitable for disposing on the protective unit 19 and the conductive sheet 13 of an irregular shape by injection molding.

Further, the plastic protective layer 15 is disposed on the protection unit 19 and partial surface of the conductive sheet 13, which can greatly reduce the contact area of the protection unit 19 and the conductive sheet 13 with the leaked electrolyte, so that the heat transfer from the leaked electrolyte to the protection unit 19 and the conductive sheet 13 can be greatly reduced for protecting other normal battery cells 11.

In general, the protection unit 19 and a plurality of conductive sheets 13 are connected firstly, and then the battery cell 11 and the conductive sheet 13 are connected. However, the protection unit 19 generally unstable supports the conductive sheets 13. Therefore, when the conductive sheet 13 and the protection unit 19 that are connected to each other are moved, the connection between the conductive sheet 13 and the protection unit 19 may be deformed or distorted, and thus conductive sheet 13 connected with the protection unit 19 is not easily to be connected to battery cell 11.

In the embodiment of the invention, the plastic protective layer 15 covers the protection unit 19 and the conductive sheet 13, and strengthens the connection and structure between the protection unit 19 and the conductive sheet 13 to avoid the protection unit 19 and the conductive sheet 13 to be deformed or distorted. Thus, conductive sheets 13 connected with the protection unit 19 are able to be connected to the battery cells 11 easily.

Thus, the invention provides the protection unit 19 for protecting the defective battery cell 11 can be protected by the protection unit 19, and further provides the plastic protection layer 15 coving the protection unit 19 and the conductive sheet 13 to reduce contact area of the protection unit 19 and the conductive sheet 13 with the leaked electrolyte, so as to prevent the battery cell 11 connected to the conductive sheet 13 from being damaged due to high temperature. In addition, the plastic protective layer 15 can also strengthen the connection between the protection unit 19 and the conductive sheet 13 and facilitate the connection between the conductive sheet 13 and the battery cell 11.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A battery module including:
   a plurality of battery cells;
   a plurality of conductive sheets being respectively connected with said battery cells in series;
   at least one protection unit being connected to two said conductive sheets, and thus said battery cells connected in parallel via said protection unit, wherein when temperature of said protection unit is greater than a preset temperature, or current of said protection unit is greater than a preset current, said protection unit will be disconnected; and
   at least one plastic protective layer disposed on said protection unit and partial surface of said conductive sheet by injection molding.

2. The battery module of claim 1, wherein the protection unit is a thermal fuse, a current fuse, a solder wire, a single-core copper wire, a self-resetting fuse or a resistor.

3. The battery module of claim 1, wherein said plurality of battery cells are arranged as a matrix along a first direction and a second direction, said first direction is perpendicular to said second direction, adjacent said battery cells in said first direction are arranged in opposite directions, and the arrangement direction of said battery cell adjacent to said second direction is the same.

4. The battery module of claim 1, further comprising at least fixed frame having a plurality fixed holes for containing and fixing said battery cells.

5. The battery module of claim 1, further comprising a first conductive sheet and a second conductive sheet being respectively connected part of said battery cells in parallel to be an output terminal or an input terminal, and said plastic protective layer being disposed on partial surface of said first conductive sheet and said second conductive sheet.

6. A battery module including:
   a plurality of battery cells;
   at least one conductive sheet being connected with said battery cells in parallel; and
   at least one plastic protective layer disposed on partial surface of said conductive sheet by injection molding.

7. The battery module of claim 6, wherein said conductive sheet is connected to said battery cells in serial and in parallel.

8. The battery module of claim 7, wherein said conductive sheets comprises a plurality of first conductive parts and at least one second conductive part, said first conductive parts are connected to said battery cells in series, said second conductive part is connected to said first conductive parts, and thus said battery cells connected to said first conductive part are connected in parallel via said second conductive part.

9. The battery module of claim 8, wherein said plastic protective layer covers said second conductive part completely, and covers partial surface of said first conductive part.

10. The battery module of claim 7, further comprising at least one fixed frame having a plurality of fixed holes for containing and fixing said battery cells.

11. The battery module of claim 7, further comprising a first conductive sheet and a second conductive sheet being respectively connected part of said battery cells in parallel to be an output terminal or an input terminal, and said plastic protective layer being disposed on partial surface of said first conductive sheet and said second conductive sheet.

* * * * *